J. BAUMHOER, DEC'D.
C. A. DIRCKX, ADMINISTRATOR.
TRACTION WHEEL.
APPLICATION FILED JAN. 16, 1915.
1,181,059.
Patented Apr. 25, 1916.
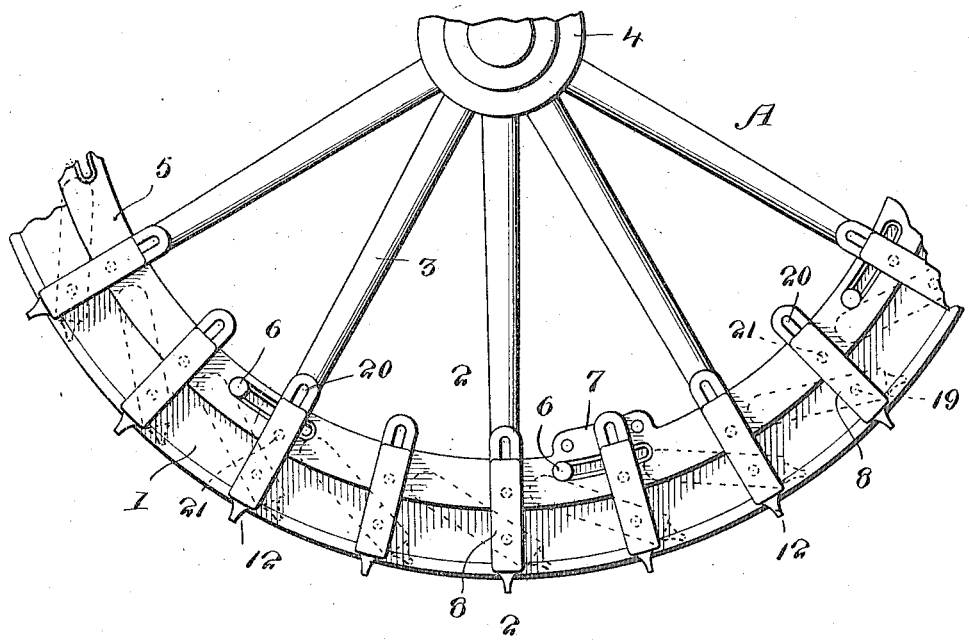
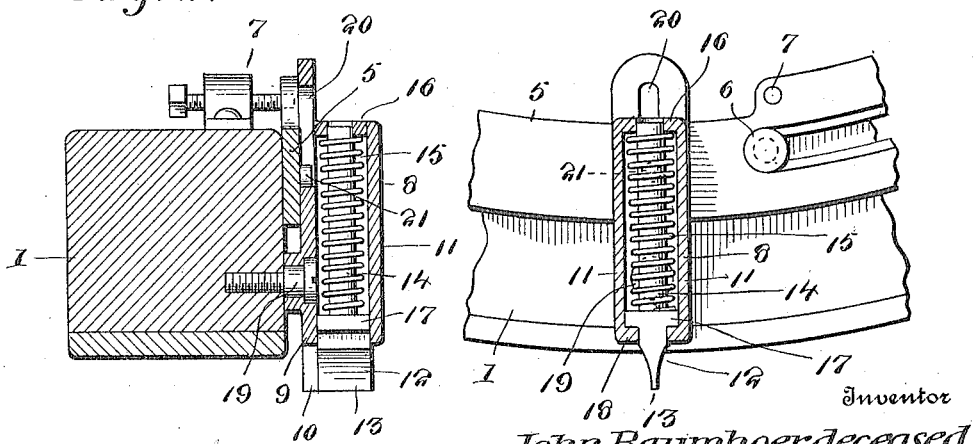

UNITED STATES PATENT OFFICE.

JOHN BAUMHOER, DECEASED, LATE OF JEFFERSON CITY, MISSOURI, BY CLEM A. DIRCKX, ADMINISTRATOR, OF JEFFERSON CITY, MISSOURI.

TRACTION-WHEEL.

1,181,059.     Specification of Letters Patent.     Patented Apr. 25, 1916.

Application filed January 16, 1915. Serial No. 2,745.

*To all whom it may concern:*

Be it known that JOHN BAUMHOER, deceased, formerly and up to the time of his death a citizen of the United States residing at Jefferson City, in the county of Cole and State of Missouri, did invent new and useful Improvements in Traction-Wheels, of which the following is a specification.

This invention relates to traction wheels, the object in view being to provide means used in connection with and mounted upon a vehicle and particularly such a wheel as is used for driving motor cars, traction engines and the like, whereby, whenever necessary, the traction of such wheel may be increased proportionately to the requirement at any particular time in accordance with the nature of the road surface being operated upon.

With the above and other objects in view, the invention consists in the novel construction, combination and arrangement of parts, as herein described, illustrated and claimed.

In the accompanying drawings:—Figure 1 is a side elevation of a portion of a vehicle wheel showing the same equipped with the present invention. Fig. 2 is a cross section showing the means for adjusting the traction spikes. Fig. 3 is a section through the same taken lengthwise of one of the traction spikes.

Referring to the drawings A generally designates the body of a vehicle wheel having the usual felly 1, spokes 3 and hub 4.

In carrying out the present invention a ring or annulus 5 is employed which is concentric with the hub of the wheel and which is adapted to be partially rotated around the hub independently of the wheel between a circular series of guides 6, the annulus being further adapted to be held fixed by any suitable fastening means such as is indicated at 7. In connection with the wheel and annulus is employed a circular series of traction spike holders 8 each of which comprises a base 9 which is preferably pointed at its outer end as shown at 10 so that when it projects beyond the tire of the wheel it will engage the road surface and obtain a firm hold thereon. In addition to the base 9 each holder comprises the opposite parallel sides 11 between which is mounted a slidable traction spike 12 having its outer end pointed as shown at 13 to engage the road surface when projected beyond the tire.

The inner portion of each spike 12 is reduced and rounded as shown at 14 and is surrounded by a coiled expansion spring 15 which is interposed between the head of the spike 12 and stop shoulders 16 at the inner end and upon the inside of the holder 8. It is also desirable to provide the head of each slidable spike with oppositely located stop shoulders 17 to come in contact with other shoulders 18 upon the inside of the holder 8 thereby limiting the outward movement of the slidable spike as it is moved outward by the thrust spring 15.

Each of the holders 8 is pivotally connected at 19 to the body A of the wheel adjacent to the outer end of the holder. Adjacent to its inner end each holder is provided with a longitudinal slot 20 which receives a pin 21 projecting from the annulus 5 so that when the annulus is turned, the spike holders are all simultaneously turned on their pivots 19 to cause the points of the spikes to project beyond the tire or to be retracted within the plane of the tire so as not to engage the road surface.

From the foregoing description taken in connection with the accompanying drawings it will now be understood that under normal conditions, the annulus 5 is turned in such a direction as to withdraw the pointed ends of the spikes within the plane of the tire so that they will not operate on the road surface. When, however, greater traction is required, as in case the machine becomes mired, the annulus 5 is freed by loosening the fastening devices 7 and is then turned in such a direction as to swing the spike holders and thrust the points of the spikes outwardly beyond the tire where they will obtain a firm hold on the road surface, this action being brought about by reason of the pins 21 moving lengthwise of the slots 20 in the spike holders. The pointed ends 10 of the bases 9 of the holders will themselves obtain a certain degree of hold on the road surface but the spring thrust spikes are of greater width at their extremities so as to obtain a much greater hold on the road surface while at the same time they are adapted to yield inwardly under the cushioning action of the thrust spring 15.

The mechanism referred to is carried on the wheel constantly so that it is always ready for use. It is only necessary to loosen the fastening devices 7, adjust the annulus and refasten the latter when adjusted thus doing away with the objectionable and time consuming operation of applying tire chains to the wheels.

What is claimed is:—

The combination with a vehicle wheel, of an annulus concentric with the wheel hub and adapted to be turned partially around said hub, a plurality of traction spike-holders each having a pivotal connection with the wheel and a direct positive connection with said annulus, traction spikes carried by said holders, and slidable relatively thereto, and springs in said holders for thrusting said spikes outwardly beyond the tire of the wheel and permitting said spikes to yield inwardly.

In testimony whereof, I affix my signature in the presence of two witnesses.

CLEM A. DIRCKX,

*Administrator of the estate of John Baumhoer, deceased.*

Witnesses:
O. L. MOORE,
C. D. AMOS.

Copies of this patent may be obtained for five cents each, by addressing the "Commissioner of Patents, Washington, D. C."